Oct. 30, 1951   J. P. ZALLEA ET AL   2,573,530
METHOD OF MAKING WELDED STEEL UNITS
Original Filed Aug. 18, 1945   5 Sheets-Sheet 1
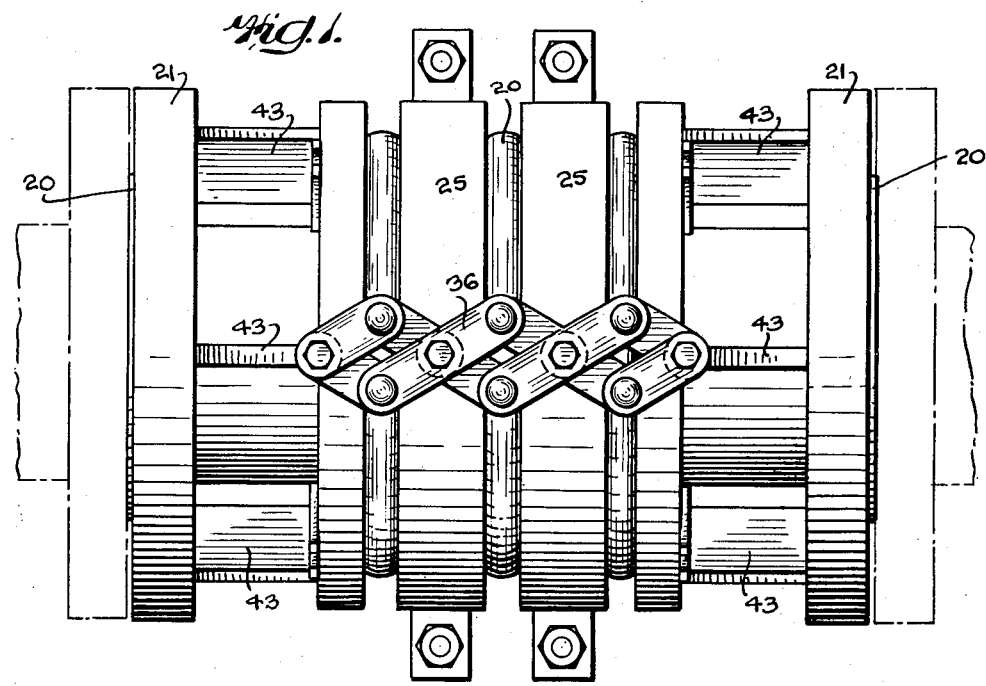
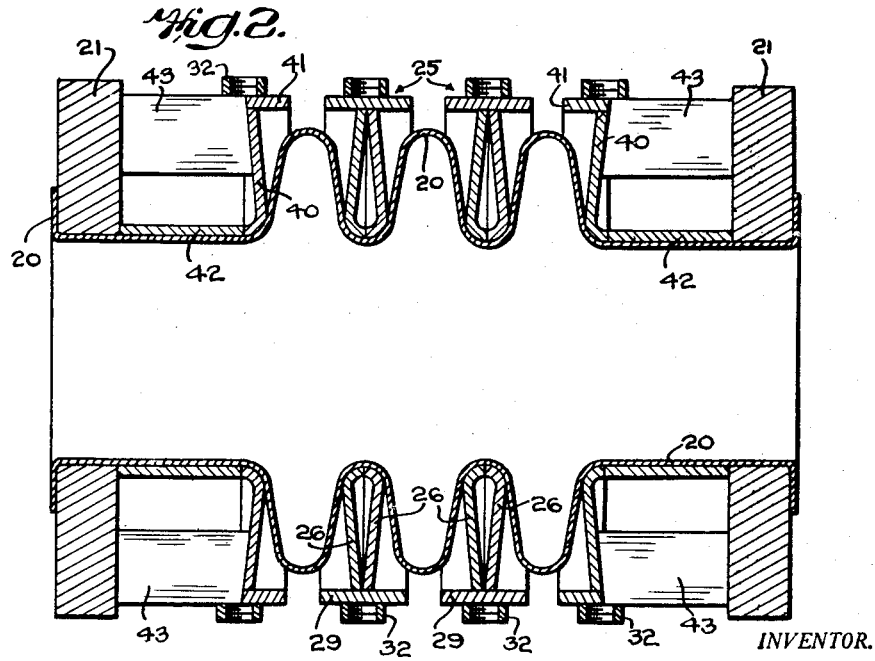
INVENTOR.
JAMES P. ZALLEA
BY JOHN J. MANK INVENTOR.
JAMES P. ZALLEA
BY JOHN J. MANK
Lee Edelson
attorney Oct. 30, 1951    J. P. ZALLEA ET AL    2,573,530
METHOD OF MAKING WELDED STEEL UNITS
Original Filed Aug. 18, 1945    5 Sheets-Sheet 3
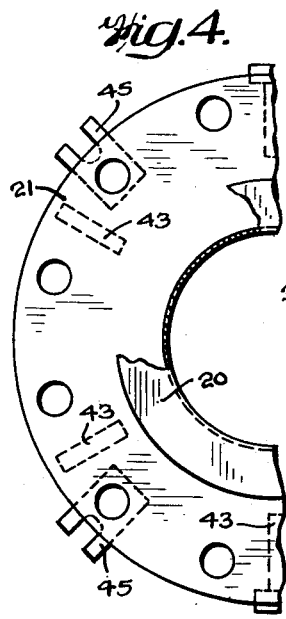
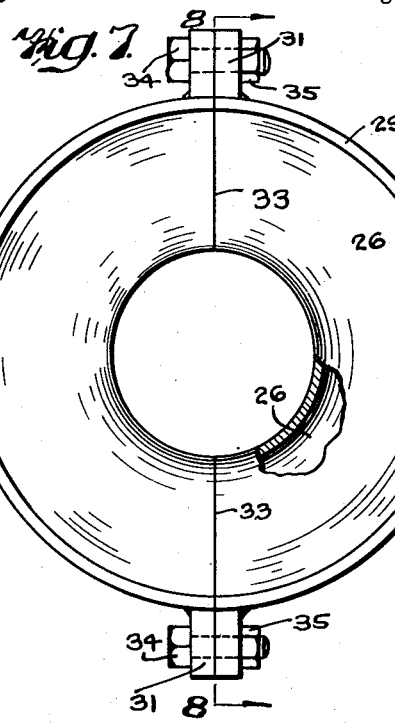
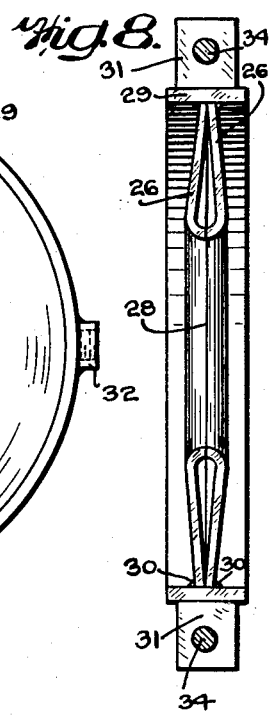
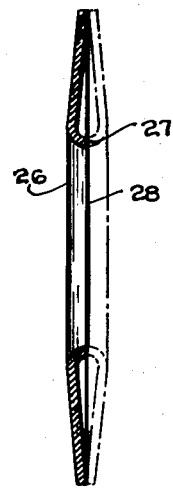
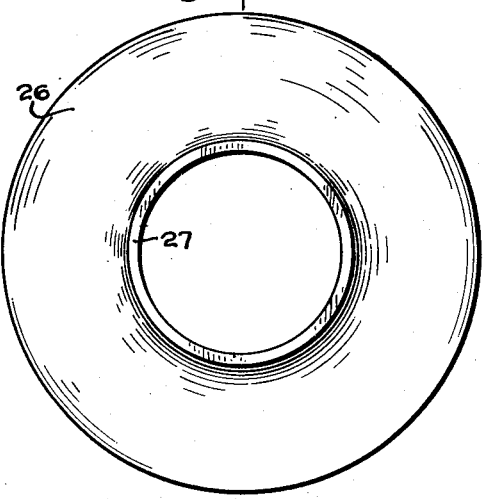
INVENTOR.
JAMES P. ZALLEA
BY JOHN J. MANK
Attorney Oct. 30, 1951  J. P. ZALLEA ET AL  2,573,530
METHOD OF MAKING WELDED STEEL UNITS
Original Filed Aug. 18, 1945  5 Sheets-Sheet 4
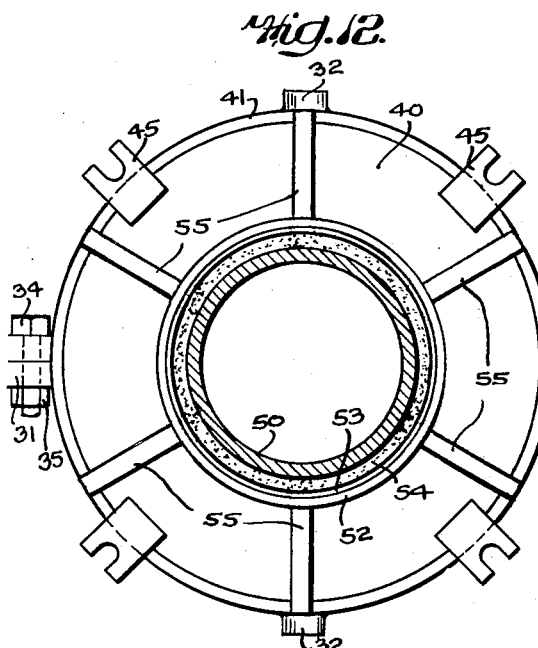
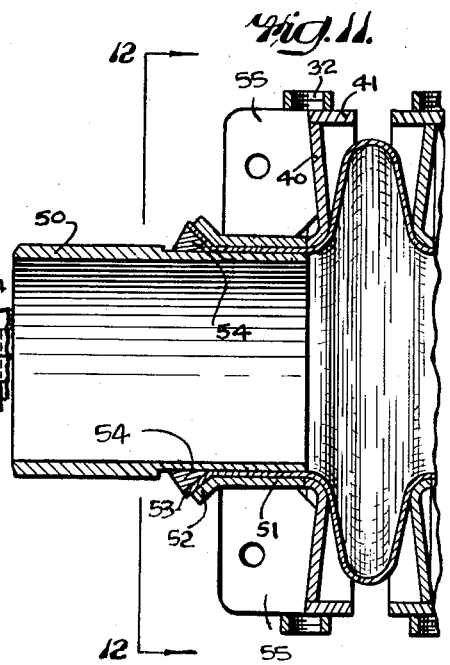
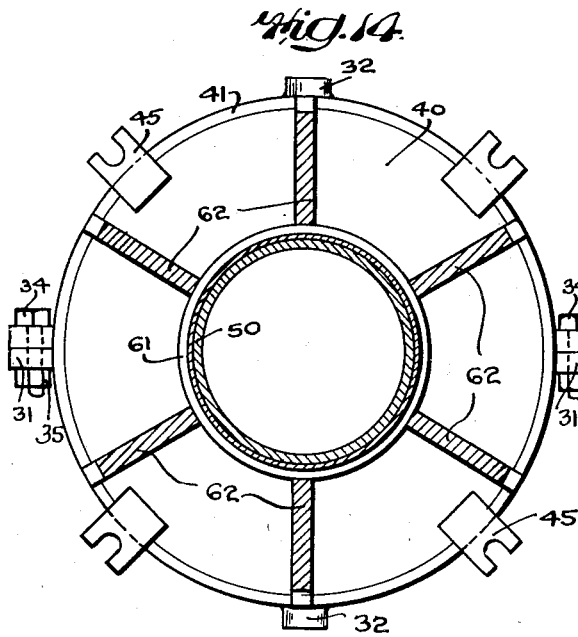
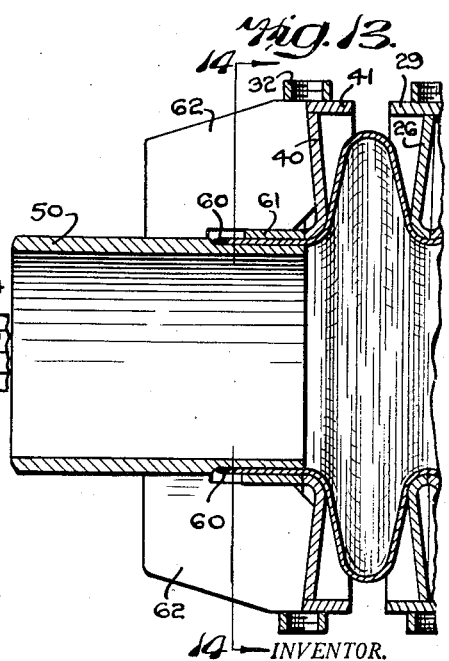
INVENTOR.
JAMES P. ZALLEA
JOHN J. MANK
BY Oct. 30, 1951 J. P. ZALLEA ET AL 2,573,530
METHOD OF MAKING WELDED STEEL UNITS
Original Filed Aug. 18, 1945 5 Sheets-Sheet 5

INVENTOR.
JAMES P. ZALLEA
JOHN J. MANK
BY Lew Edelson
attorney.

Patented Oct. 30, 1951

2,573,530

UNITED STATES PATENT OFFICE 2,573,530

METHOD OF MAKING WELDED STEEL UNITS

James P. Zallea, Wilmington, and John J. Mank, Newark, Del., assignors to Zallea Brothers, Wilmington, Del., a partnership consisting of James P. Zallea and Sol Zallea Original application August 18, 1945, Serial No. 611,400, now Patent No. 2,489,844, dated November 29, 1949. Divided and this application March 31, 1948, Serial No. 18,138

5 Claims. (Cl. 29—148)

1

This application is a division of copending application, Serial No. 611,400, filed August 18, 1945, issued November 29, 1949, as Patent No. 2,489,844.

The present invention relates generally to tubular expansion joints employed between and coupled to portions of rigid pipes or conduits for the purpose of absorbing expansions and contractions of such pipes or conduits. Such expansion joints employ a relatively thin walled, more or less flexible, circumferentially corrugated tube made of suitable material such as copper, copper alloys, stainless steel or other materials. Such expansion joints are also provided with external reinforcing elements, more commonly in the form of encircling annular structures, portions of which extend radially into the valleys of the corrugations and other portions of which extend axially of the tube and surround the peaks of the corrugations. These reinforcing devices are designed for the purpose of limiting the extension or contraction of the expansion tube. The present invention is particularly directed to the design and construction of these encircling reinforcing and limiting elements and to the method of making the same.

In addition, expansion joints also include end portions firmly and permanently associated with the ends of the expansion tubes which serve for coupling the expansion joints to corresponding portions of the conduits. The present invention is directed in part to the structure of these end portions of the expansion joint.

One object of the present invention is to provide reinforcing elements which are greatly reduced in weight as compared with the reinforcing elements known hitherto. These reinforcing elements are supported and carried by the thin walled flexible expansion tubes. When the reinforcing elements are relatively heavy the expansion tubes have a tendency to buckle and become misshapen. By means of the present invention whereby the weight of these reinforcing elements is minimized the tendency of the expansion tube to buckle is substantially eliminated.

Essentially the reinforcing rings employed in the present invention are hollow toroids welded to the inner face of a ring.

The present invention also aims to facilitate the manufacture of the several types of end construction with a minimum of stock on hand. This object is accomplished by the use of the pressed or stamped elements which are employed in the formation of the reinforcing rings as end expansion limiting members.

Another object of the present invention in the

2 end construction is to provide a structural arrangement whereby the thrust from the pipe is transmitted to the expansion tube uniformly circumferentially of the tube by a thrust receiving element.

Another object of the present invention is to minimize and substantially eliminate the expensive machining operations which are involved in the constructions known hitherto which employ castings which have to be machined.

Other objects and advantages of the present invention will become apparent to persons skilled in the art from the accompanying drawings and the present specification.

In the drawings:

Figure 1 is a plan view of one embodiment of the present invention;

Figure 2 is a sectional view thereof showing the expansion joint in its fully expanded position;

Figure 4 is a partly broken end view of Figure 3;

Figure 7 is a face view of reinforcing ring;

Figure 8 is a view thereof as shown by line 8—8 of Figure 7;

Figure 9 is a sectional view of one of the pressed rings taken on line 9—9 of Figure 10;

Figure 10 is a plan view of one of the pressed rings;

Figure 11 is a sectional end view of another form of end construction;

Figure 12 is an end view thereof;

Figure 13 is a sectional view of still another form of end construction;

Figure 14 is an end view thereof;

Figure 5:
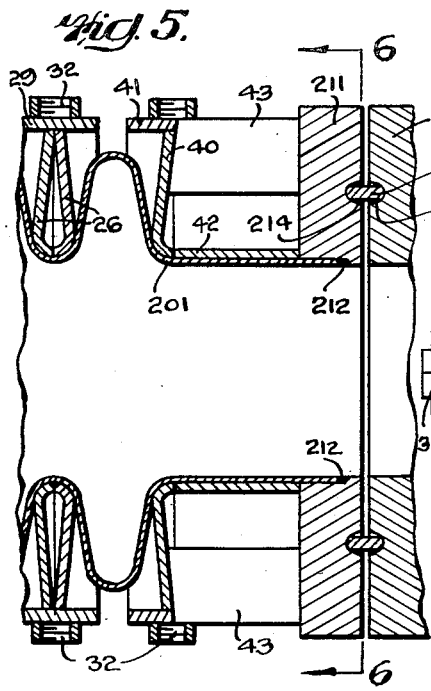
Figure 5 is a sectional view of a modified end structure of the expansion joint.
Figure 6:
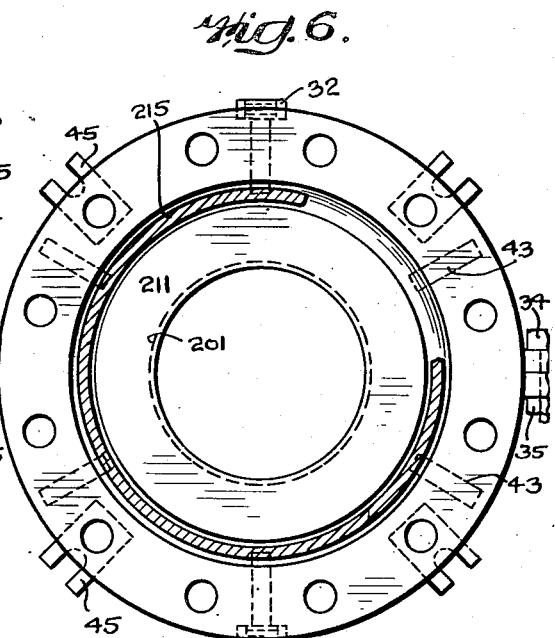
Figure 6 is an end view thereof taken on line 6—6 of Figure 5.

Figure 1 illustrates generally the type of organization to which the present invention relates. It will be seen that essentially it comprises a corrugated thin walled flexible expansion tube 20. The ends of the tube 20 are associated with or affixed to bolting ends 21 at each end of the tube. In the form shown in Figures 1, 2, 3 and 4 the ends of the expansion tube 20 are spun over the free faces of the bolting end flanges 21 to provide what is known as a Vanstone facing. When the expansion joint is inserted between a pair of bolting ends of conduits shown in dotted lines in Figure 1 and is permanently assembled therewith as by bolts or the like, the spun over end of the tube 20 will be gripped at each end between a pair of bolting flanges. Other forms of end construction are shown in Figures 5 and 6 and in Figures 11 to 16 inclusive, which will be described in detail in a later portion of the specification.

The reinforcing annular rings are generally indicated by reference character 25 and are substantially the same in all forms of the present invention. At this point, therefore, the structure and method of manufacture of the reinforcing annular elements 25 will be detailed.

Figures 9 and 10 together show the basic element which is employed in the construction of the present reinforcing ring and which as will be seen from a later portion of the specification is also employed as part of the end construction of the expansion joint. This element consists of an annulus 26, preferably of steel, which is shaped as by a stamping operation into the form indicated in full lines in Figure 9 of the drawings. It will be seen that by the stamping operation the material adjacent the inner edge 27 is curved so that the edge 27 is planar, while the flat body portion of the annulus is dished as shown so that its peripheral edge lies approximately in or closely adjacent to the plane of the inner edge 27. It is this principle of construction of the annulus 26 that permits of the next step in the manufacture of reinforcing rings 25. As shown by dotted lines in Figure 9, a duplicate annulus 26 is turned face to face to the annulus shown in full lines. In this position the edges 27 abut and the same are welded together along the line 28. The peripheral portions of the plates 26 may contact each other as shown in Figure 9 or they may be more or less spaced from each other as in the modification shown in Figures 17 and 18 to be described hereinafter. The essential feature of this phase of the present invention resides in the suitable shaping of the inner portion of the annulus 26 so that when the pair are welded they form a suitable shape for engaging the corrugations of the expansion tube 20 as shown in the drawings. The annulus 19 produced by welding the shaped units 26 forms a hollow toroid; and the preshaped annulus 26 will be hereinafter referred to as a hemitoroid.

As a next step, the hollow toroid 19 is inserted into the interior of a circular band 29 and its peripheral edges are welded to the interior of the band 29 as shown by the welding material 30 in Figure 8. A relatively thick apertured ear 31 is welded to the exterior of the band 29 at diametrically opposed points. In addition, the band 29 has welded thereto internally threaded bosses 32 at diametrically opposed points and preferably half way between the ears 31. (See Figure 7.)

It will now be understood that at this point the reinforcing ring 25 is in the form of an annular unit consisting of the circular band 29 and hollow toroid 19 disposed within and welded to the band together with a pair of heavy ears 31 and tapped bosses 32. At this point the structure thus obtained is cut in two along a diameter which halves the ears 31 as shown by line 33. Figure 8 represents an end view of the cut face of one of these halves. It will now be understood that these two halves may be readily installed over the expansion tube and when so installed are joined together by means of bolts and nuts 34 and 35. The linkage device 36 is carried by the bosses 32 and serves to equalize the extension and contraction of the several corrugations of the tube 20.

The reinforcing elements thus far described will be seen to be employed in all the forms of the invention disclosed herein and are employed in the manner shown for all types of expansion tubes whether they be of copper or stainless steel or any other suitable material. One phase of the present invention resides in the simple and rugged construction of the ends of the expansion tubes which are particularly designed to transmit the thrust of the pipe or conduit system directly to the expansion tube over a large area thereof, thereby prolonging the life of the expansion joint. In the construction of the ends of the expansion joint, whether such ends include bolting flanges as shown in Figures 1 to 4 or welding nipples as shown in Figures 11 to 14, the hemitoroid shown in Figure 10 of the drawings is employed for direct contact with the endmost corrugation of the expansion tube and for cooperation with the reinforcing rings which have been thus far described. Thus the end structure of the expansion joint as well as the reinforcing rings utilize the same basic units and are assembled and constructed by welding operations.

All of the end structures shown herein have an end expansion limiting member, which also serves to transmit thrust to the expansion tube, and which consists of the circular band 41 and the hemitoroid 40, shown as 26 in Figure 10. The hemitoroid 40 is welded to the inside of the band 41 as shown. The band 41 will be seen to cooperate with the bands 29 to limit contraction of the endmost corrugation and is approximately one-half the width of each of the bands 29.

All end structures also have a sleeve, which snugly fits over the end of the expansion tubes, the sleeve being welded to the planar edge of the ring 40. These sleeves will be seen to vary somewhat in length and other specific structural features. In Figures 2 and 5 this sleeve is shown at 42. The sleeve 42, welded to the planar edge of the hemitoroid 40 at one end, is also welded to the bolting flange 21 at the other end. Reinforcing ribs 43 are welded at one end to the bolting flange 21 and at the other end both to 40 and 41 as shown. The end unit, which includes the bolting flange 21 and the elements 40, 41, 42 and 43 together with the bosses 32 welded thereon as shown, are built up as units and mounted on the cylindrical ends of the expansion tube 20 in their circular or annular form, the free end of the tubes 20 being then spun over the flange 21. However, if desired, this end structure may be cut into two cooperating halves and mounted on the tube ends and bolted together by means of the same type of lug construction as that employed in the reinforcing rings.

The end flanges 21 each may be provided, if desired, with a pair of diametrically opposed notched lugs 45, the corresponding lugs of the longitudinally spaced flanges 21 being alined to receive in the open-ended notches thereof a longitudinally extending tie rod (not shown), these tie rods being thus so disposed lengthwise along diametrically opposite sides of the expansion joint as to effectively maintain the equalizing rings of the latter properly alined and the joint substantially rigid during storage and shipment thereof.

Figure 3:
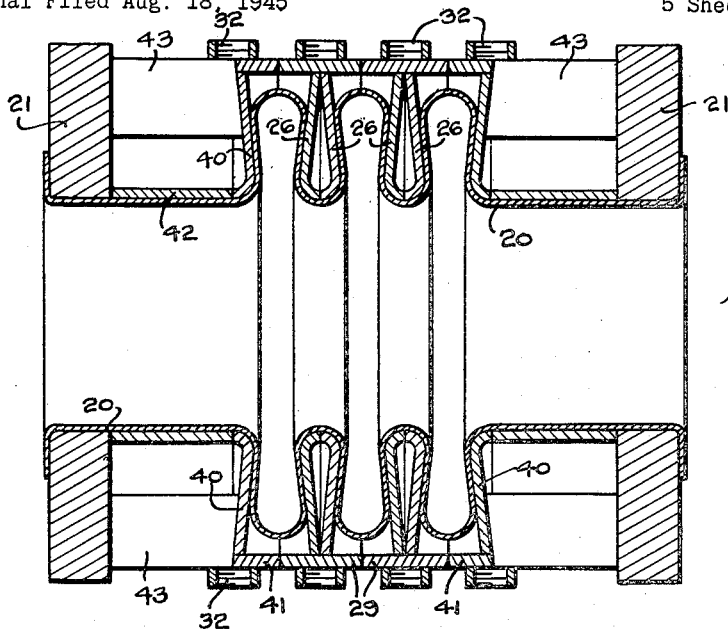
Figure 3 is a view similar to Figure 2 showing the expansion joint in its fully contracted position.

The modification of end structure shown in Figures 5 and 6 will be seen to employ the same elements 40, 41, 42 and 43 as those employed in the forms shown in Figures 2 and 3. In this form, however, the end of the expansion tube 201 lodges in a recess on the inner face of the bolting flange 211 and is welded therein as at 212. In addition, in the form shown in Figures 5 and 6 the meeting faces of the bolting flange 211 and the conduit bolting ring 213 are respectively provided with cooperating, complemental grooves 214—214 to form an annular recess within which is received a solid soft metal ring gasket 215, such as of soft iron or the like, which is compressible to seal the joint between the members 211 and 213.

The forms of end structure shown in Figures 11 to 14 employ welding nipples 50 instead of bolting flanges. As previously described, they each employ the elements 40 and 41. The sleeve 51 in Figure 11 is welded to the ring 40 and has a flared end 52. Similarly, the expansion tube also has a flared end shown by 53. It will be seen that the end of the expansion tube is disposed between the welding nipple 50 and the sleeve 51. A standard cup joint carbon or metallic arc weld 54 is formed between the end 53 of the expansion tube and the welding nipple 50. A series of circumferentially spaced thrust transmitting gussets or ribs 55 are welded to elements 40 and 41, to element 51 and its flared end 52 and, if desired, also to the welding nipple 50. With this construction the welding of the gussets to the nipples may be eliminated since the cup joint has sufficient strength in shear to transmit the thrust.

In the assembly of the end structure shown in Figures 11 and 12, the elements 40, 41 and 51 may be prefabricated and mounted on the end of the expansion tube in ring-like or annular form. If desired, however, the same may be split to provide two halves, the halves also being provided with bolting lugs and the same may then be clamped on the end of the expansion tube. The welding nipple is then inserted, the cup joint arc weld 54 is then formed and the reinforcing gussets 55 are then welded to the elements 40 and 51. The structure shown in Figures 11 and 12 is particularly applicable to copper expansion tubes but may also be applied to other types of tubes.

The construction shown in Figures 13 and 14 is particularly applicable to stainless steel expansion tubes but may also be employed for copper tubes or the like. In this form, the welding nipple 50 receives the free end of the expansion tube in an annular depression and is welded thereto by a metallic arc butt weld 60. The sleeve 61 is welded to the element 40 and the gussets or reinforcing ribs 62 are welded at their ends and edges to the elements 40, 41 and 61 to the nipple 50.

Figure 15:
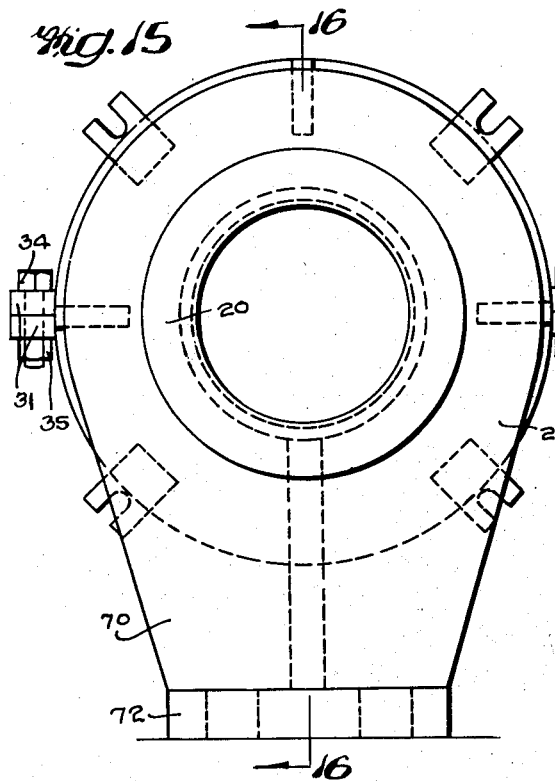
Figure 15 is an end elevational view of a joint having a basal support.
Figure 16:
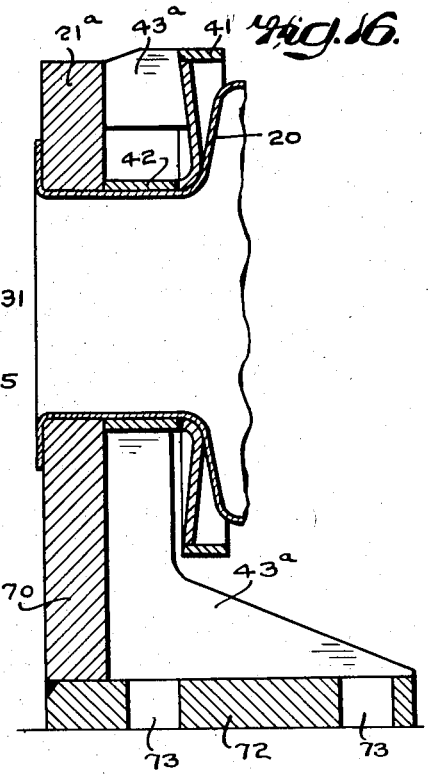
Figure 16 is a sectional view taken on the line 16—16 of Figure 15.

Figures 15 and 16 illustrate a construction of a bolting end flange 21ª which is extended downwardly, as at 70, to provide a flat bottom edge 71 which is welded to an anchor base member 72. This base member 72 is provided with bolting apertures 73 by means of which the end of the joint may be securely anchored to any suitable support and so secured in the conduit line. As in previously described forms of the joint, the elements 40 are permanently secured to the end flange 21ª by interposed gussets 43ª, the bottom gusset 43ᵇ being of the special shape shown in Figure 16 with its edges respectively welded to the sleeve 42, the end flange 21ª and the anchor base member 72 whereby the latter becomes an integral part of the end assembly of the joint. In all other material respects the joint of Figures 15 and 16 is substantially on the order of those hereinbefore described.

Figure 17:
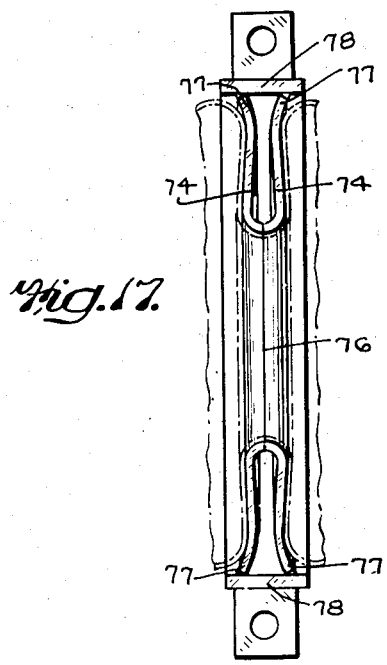
Figure 17 is a view similar to Figure 8 showing a modified form of the pressed ring.
Figure 18:
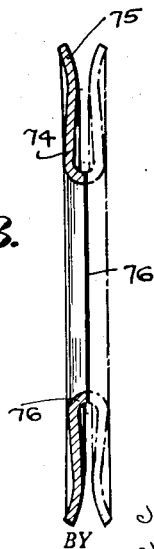
Figure 18 is a diametric cross-sectional view of one of the pressed rings of Figure 17.

If desired, the central annular reinforcing rings of the expansion joint may be somewhat modified in form by employing pressed disks 74 of the cross-sectional shape shown in Figure 18. In this shape of the disk 74, the outer edge portion 75 thereof is oppositely dished with respect to its inner edge portion 76 with the result that when two of the disks 74 are assembled as shown in Figure 17 with their inner edges welded together along the circular line 76 the outer edges 77—77 of the welded unit are divergent with respect to the median plane of the unit and so provide a relatively broad support for the circular band 78 welded thereto. The resultant ring is also in the form of hollow annular unit which in all material respects is similar in function to that shown in Figures 7 to 10, inclusive, the annular unit being split, as in the previously described form, to provide two halves which may be bolted together in embracing relation with respect to the corrugated flexible tube of the expansion joint.

Figure 5A:
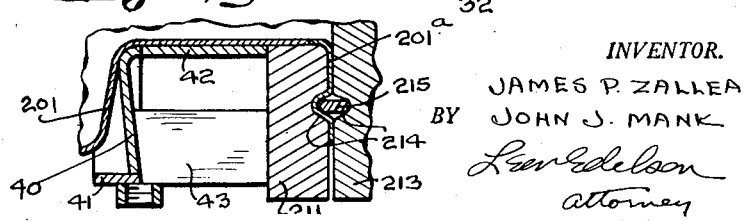
Figure 5a is a sectional view of a further modified end structure.

It will be understood, of course, that the present invention is susceptible of various changes and modifications other than those hereinbefore specifically described without departing from the real spirit or general principles of the invention. For example, Figure 5A illustrates a modification of the end construction of the joint, as shown in Figure 5, wherein the end of the corrugated tube is spun over the end bolting flange 211 instead of being welded thereto, the flanged end 201ª of the tube being then engaged by the gasket 215 to force the tube material into the annular 214 of the bolting flange 212. In this construction, as shown in Figure 5A, the expansion joint is provided with a Vanstone end facing which is effectively sealed against leakage by the compressible gasket 215.

Reviewing the several forms of end structures shown in the present application it will be observed that the thrust transmitted by the pipe or conduit system is in the first instance received by the bolting flange or welding nipple as the case may be. In each case, this thrust is transmitted by these endmost elements through the gussets or reinforcing ribs 43, 55 or 62 as the case may be to the reinforcing rings 40 which have their inner ends lodged directly against the first bend in the expansion tube. The sleeves 42, 51 and 61 in all of these forms also serve to transmit thrust to the lower edge of the reinforcing rings 40.

The bolting flanges 21 as well as the welding nipples 50 serve as a means for coupling the joint to the pipe system. These will, therefore, be referred to in the claims by the generic term "coupler."

What is claimed as new and useful is:

1. The method of forming reinforcing units for an expansion joint of the type having a corrugated flexible tube which consists, first, in forming of sheet metal a pair of identical, interchangeable annular disks each having a circular main body portion the inner edge portion of which is turned in the general direction of the central axis of the disk to present the peripheral edge of said turned portion in a plane extending substantially normal to said axis, in then arranging said pair of disks in axial registry with the inturned inner peripheral edges in abutting relation, in then uniting said abutting edges to form a unitary assembly of said pair of disks, in then securing a circular band to the outer peripheral edges of said assembled pair of disks to provide said disk assembly with an embracing rim the median plane of which is coincident with the plane of the abutting edges of said assembled pair of disks, said band being provided at diametrically spaced points thereof with a pair of radially projecting apertured lugs, and in then diametrically severing the banded disk assembly along the diametric median plane of said lugs to provide a pair of symmetrical halves adapted to be clamped together in encircling relation about the flexible tube of the expansion joint.

2. In the method as defined in claim 1 wherein the outer peripheral edges of said assembled pair of disks are axially spaced apart and respectively welded to said embracing band.

3. In the method as defined in claim 1 wherein the circular main body portions of the assembled pair of disks are dished inwardly toward each other to present the outer peripheral edges thereof in closely associated relation.

4. In the method as defined in claim 1 wherein the inturned inner edge portions of said pair of axially registered disks are rounded to conjointly provide the internal edge of the annular disk assembly with a smoothly rounded surface symmetrical with respect to the median plane of the assembly.

5. The method of forming reinforcing units for expansion joints of the type having a corrugated flexible tube which consists, first, in forming a circumferentially continuous annulus having a smoothly rounded inner edge and an external peripheral edge disposed in a cylindrical surface coaxial with said annulus, in then securing a circumferentially continuous circular band to said peripheral edge of the annulus, said band being of greater width than said peripheral edge of the annulus and being centered with respect thereto to provide said annulus with an embracing rim the opposite edges of which uniformly overhang the opposite sides of said peripheral edge, in providing said band with a pair of diametrically opposed, radially projecting lugs respectively apertured along axes extending normal to the axis of said annulus, and in then diametrically severing the banded annulus along the diametric median plane of said lugs to split the latter and said annulus and so provide a pair of symmetrical halves adapted to be clamped together in encircling relation about the flexible tube of the expansion joint.

JAMES P. ZALLEA.
JOHN J. MANK.

REFERENCES CITED

The following references are of record in the file of this patent:

UNITED STATES PATENTS

| Number | Name | Date |
|---|---|---|
| 1,000,602 | Jacobs | Aug. 15, 1911 |
| 1,052,709 | Badger | Feb. 11, 1913 |
| 1,350,830 | Murray | Aug. 24, 1920 |
| 1,526,015 | Sanner | Feb. 10, 1925 |
| 1,717,196 | Emmet | June 11, 1929 |
| 1,806,009 | Whitacre | May 19, 1931 |
| 1,835,298 | Greene | Dec. 8, 1931 |
| 1,982,403 | Sneed | Nov. 29, 1934 |
| 2,414,987 | Tobey | Jan. 28, 1947 |
| 2,489,844 | Zallea | Nov. 29, 1949 |